United States Patent [19]
Ferguson et al.

[11] Patent Number: 5,865,906
[45] Date of Patent: Feb. 2, 1999

[54] ENERGY-BAND-MATCHED INFRARED EMITTER FOR USE WITH LOW BANDGAP THERMOPHOTOVOLTAIC CELLS

[75] Inventors: Lucian G. Ferguson, Seattle; Lewis M. Fraas, Issaquah, both of Wash.

[73] Assignee: JX Crystals Inc., Issaquah, Wash.

[21] Appl. No.: 702,184

[22] Filed: Aug. 23, 1996

Related U.S. Application Data

[60] Provisional application No. 60/015,902 Apr. 22, 1996.

[51] Int. Cl.[6] .................................................. H01L 31/00
[52] U.S. Cl. ............................................................ 136/253
[58] Field of Search ............................................. 136/253

[56] References Cited

U.S. PATENT DOCUMENTS

| | | | |
|---|---|---|---|
| 3,929,510 | 12/1975 | Kittl | 136/247 |
| 4,707,560 | 11/1987 | Hottel et al. | 136/253 |
| 4,776,895 | 10/1988 | Goldstein | 136/253 |
| 4,906,178 | 3/1990 | Goldstein et al. | 431/79 |
| 4,976,606 | 12/1990 | Nelson | 431/79 |
| 5,080,724 | 1/1992 | Chubb | 136/253 |
| 5,312,521 | 5/1994 | Fraas et al. | 136/253 |
| 5,356,487 | 10/1994 | Goldstein et al. | 136/253 |
| 5,383,976 | 1/1995 | Fraas et al. | 136/253 |
| 5,389,158 | 2/1995 | Fraas et al. | 136/244 |
| 5,401,329 | 3/1995 | Fraas et al. | 136/253 |
| 5,403,405 | 4/1995 | Fraas et al. | 136/253 |
| 5,439,532 | 8/1995 | Fraas | 136/253 |
| 5,601,661 | 2/1997 | Milstein et al. | 136/253 |

OTHER PUBLICATIONS

H. Höfler et al, *Solar Cells*, vol. 10, pp. 257–271 (1983).
D. L. Chubb, *Conference Record, 21st IEEE Photoro Hare Specialists Conf.* (1990), pp. 1326–1333.
H.A. Macleod, "Thn–Film Optical Filters", McGraw–Hill Publishing Company, pp. 499–502 (1989).

*Primary Examiner*—Mark Chapman
*Attorney, Agent, or Firm*—James Creighton Wray; Meera P. Narasimhan

[57] ABSTRACT

A thermophotovoltaic generator includes an infrared cobalt oxide doped refractory ceramic emitter having a broad power band region which is matched with the energy conversion band of a low bandgap thermophotovoltaic cell receiver. The generator is provided with a heat source or is constructed for mounting on a heat source or for holding a heat source, such as a radioisotope. The generator is compatible with any heat source, including, but not limited to, a hydrocarbon flame, nuclear reactors, and radioisotopes. The emitter is made of a refractory ceramic material such as cobalt oxide doped alumina or magnesia. The refractory compound of the emitter is preferably doped with a small number of substitutional ions to create a material for emitting near blackbody radiation in a wide wavelength band above a threshold energy level and a minimal amount of radiation at wavelengths longer than the threshold level. In preferred embodiments of the present invention, the cobalt oxide doped emitter strongly emits infrared radiation in a wavelength interval between about 1 and 2.1 microns. The photovoltaic cells of the receiver are preferably of Ge cells, GaSb cells, In(1–z)Ga(z)As cells and Ga(1–x)In(x)Sb(1–y)As(y), where x and y range between 0 and 0.2 and z ranges between 0.3 and 0.7. A silica heat shield may be positioned between the emitter and the receiver when combustion heat sources are used for confining the combustion byproduct gases.

33 Claims, 4 Drawing Sheets

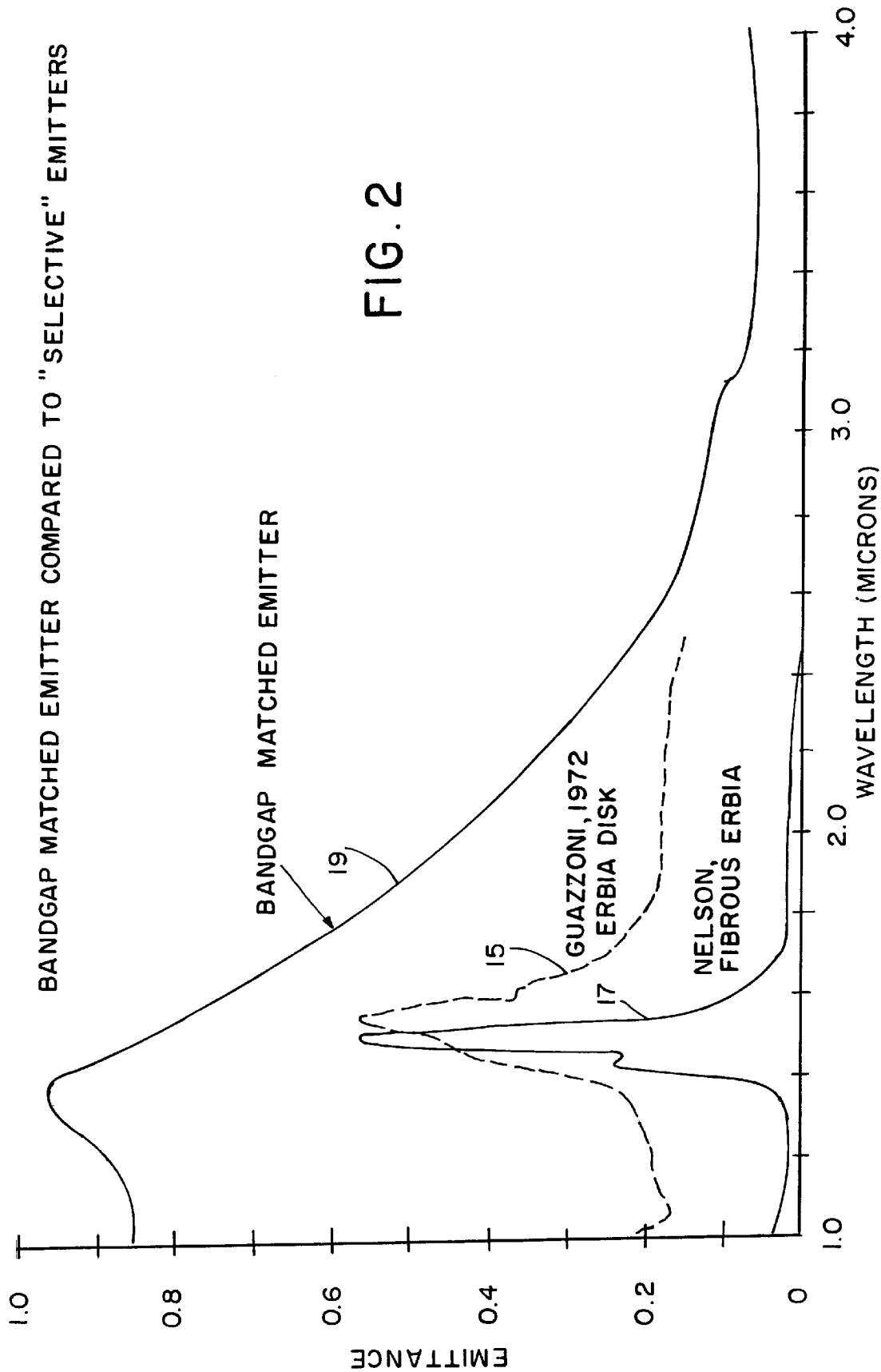

FIG. 5
EMISSIVE POWER OF ALUMINA WITH COBALT OXIDE DIFFUSION
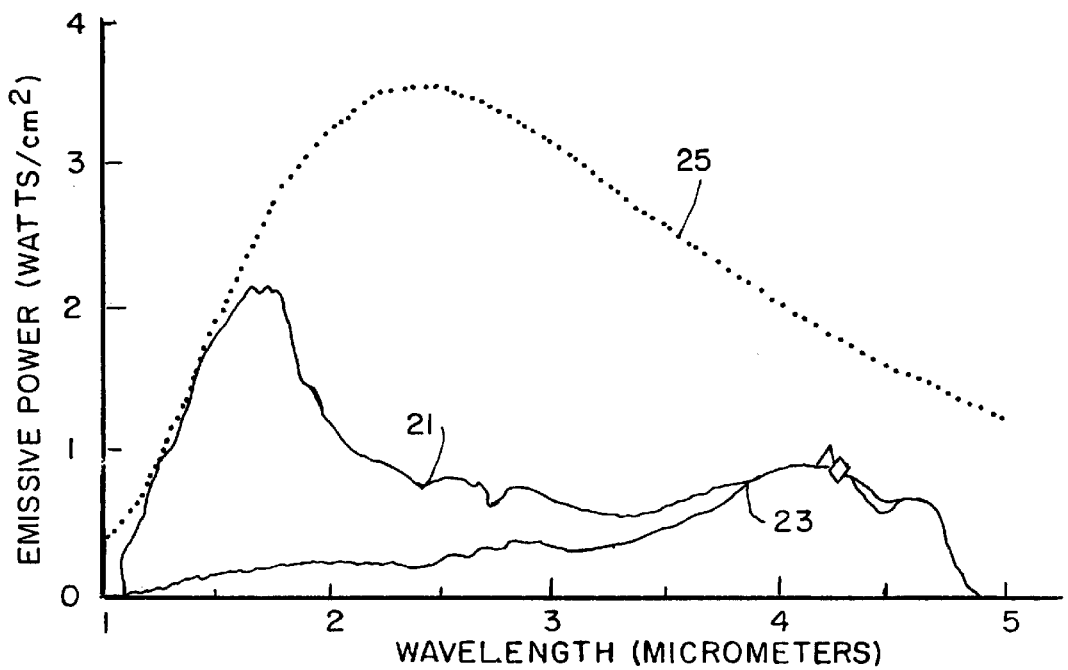
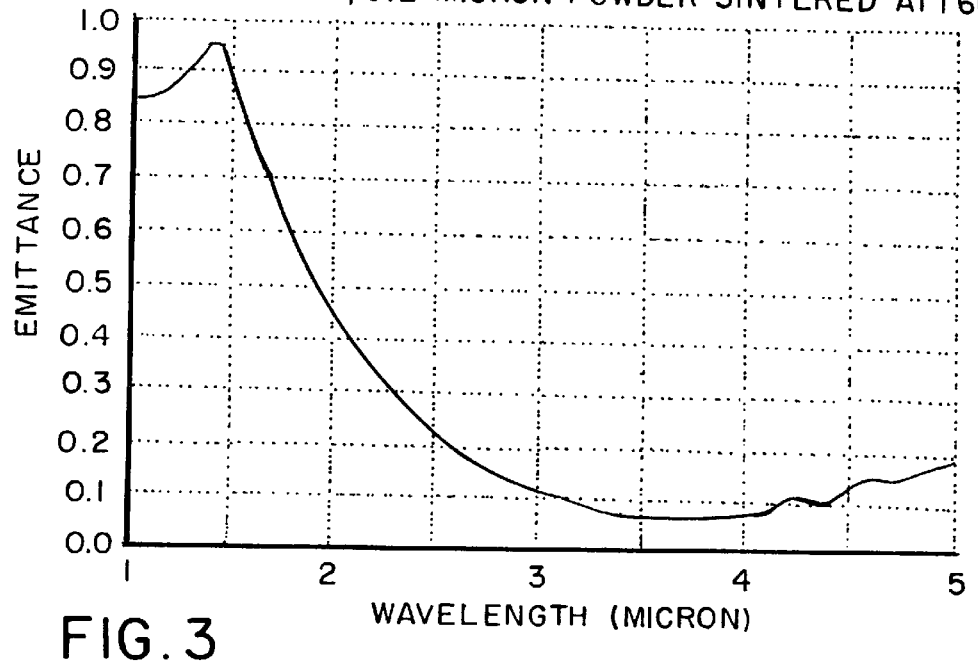
FIG. 3

ENERGY-BAND-MATCHED INFRARED EMITTER FOR USE WITH LOW BANDGAP THERMOPHOTOVOLTAIC CELLS

BACKGROUND OF THE INVENTION

This application claims the benefit of U.S. Provisional Application No. 60/015,902, filed Apr. 22, 1996.

This invention relates to thermophotovoltaic (TPV) power generators which convert infrared radiant energy to electric power using low band gap photovoltaic cells. In a copending application, Ser. No. 08/629,409 filed Apr. 18, 1996 entitled "Liquid Fuel Fired Infrared Lantern Thermophotovoltaic Generator", the present inventors described a cobalt doped refractory oxide energy-band-matched infrared emitter for use with low bandgap thermophotovoltaic cells. The specific refractory oxide disclosed included alumina. The specific thermophotovoltaic cells disclosed in that application included Ge, GaSb, InGaAs, and GaInSbAs.

Research on "selective" emitters began at least 30 years ago with reports by Guazzoni, Schwartz, and others attempting to improve the efficiency of TPV generators. Narrow band (100 nm bandwidth) emitters that rely on electronic transitions of rare earth oxides were identified. Ytterbia has an emission peak at 0.98 microns, which is well suited for use with silicon cells, and erbia has an emission peak at 1.55 microns, which is well suited for use with a lower bandgap photovoltaic cell such as germanium. Disadvantages of those selective emitters include the intrinsically narrow bandwidths due to the quantum nature of the electronic transitions, very low peak emissivities (typically only 0.55 at 1743 K for Erbia), very high emissivities outside of the desired wavelength range, and failure with solid geometries due to thermal stress.

Nelson showed that "selective" emitters could be improved by constructing emitters with small diameter fibers (about 10 microns) containing rare earth oxides, rather than using the previous solid geometries. By using small diameter fibers, the emitters suppress unwanted radiation in the 1 to 4 micron wavelength interval and make the emitters resistant to failure because of thermal stress. However, substantial infrared radiation is still emitted from the lattice vibrations in the fiber matrix at wavelengths longer than 4 microns. Furthermore, the combustion byproduct gases, water and carbon dioxide, also emit radiation at longer wavelengths. Because of the narrow bandwidth of those emitters, the power in the cell response band is still small compared to the unwanted longer wavelength power. It is still necessary to substantially increase the power in the cell band while suppressing the unwanted power at longer wavelengths.

A 1988 patent (U.S. Pat. No. 4,776,895) describes an invention based on ceramic materials which emit thermally stimulated quantum radiation in AT LEAST TWO characteristic wavelength bands to be matched to a multilayer photovoltaic collector. That invention is an attempt in part to compensate for the very narrow emission bands of "selective" emitters by using multiple "selective" emitters and multiple photovoltaic collectors. A single narrow emission peak from a "selective" emitter is not converted efficiently to electrical power by a single photovoltaic cell when the photovoltaic cell has a high quantum yield that is much wider than the emission peak. Currently it is prohibitively expensive to produce multilayer high efficiency photovoltaic collectors, but more significant problems exist with this approach. Even with multiple peak "selective" emitters the peak emittance is still poor, the bandwidth of the peak is too narrow for efficient use with a photovoltaic collector with good quantum yield such as GaSb, and radiation at undesirable wavelengths is still high.

U.S. Pat. No. 5,356,487 describes a porous ceramic burner comprised of multiple fiber layers. Fiber matrix ceramic burners typically consist of rare earth/alkaline earth oxide systems, rare earth/transition metal oxide systems, and various other mixed metal oxide systems. The porous ceramic matrix is used to hold small diameter fibers and is reported to be an improvement over previous general fiber matrix burners which have been found to deteriorate at high temperatures causing harmful oxide of nitrogen emissions to increase rapidly. The emitters disclosed in U.S. Pat. No. 5,356,487 are complicated and require many process steps. In addition, the peak emittance of the emitter at desirable characteristic wavelengths is poor.

Alternative prior art TPV generator concepts propose the use of infrared filters combined with full spectrum emitters for spectral power control. The idea is that although an emitter such as low purity conductive (black) SiC emits radiation at all wavelengths in the infrared, the filter will pass only the useful shorter wavelengths which the cell can convert to electric power. The filter would reflect all longer wavelength energy back to the emitter. The problem with that approach has been the lack of such a perfect filter. Specifically for the GaSb cell, the useful cell convertible wavelengths are in the 1 to 1.8 micron band. A dielectric filter can be made to reflect the 1.8 to 3.6 micron wavelengths back to the emitter, but it still passes wavelengths beyond 4 microns. Alternatively, an infrared reflecting metal-dielectric filter can be made that transmits most of the energy with wavelengths below 1.8 microns and reflects most of the energy beyond 2.5 microns. However, those metal-dielectric filters transition slowly from transmitting to reflecting between 1.8 and 2.5 microns, allowing a large amount of nonconvertible energy to be wasted in this energy interval. It is desirable to find an emitter that emits strongly in the 1 to 1.8 micron band while emitting weakly in the 2 to 4 micron band for use with GaSb cells.

Relative to the rare earth oxide selective emitters, it is necessary to increase the infrared emitted power in the acceptance band of the cell while suppressing the unwanted infrared power emitted at longer wavelengths. There is also a need to recycle the radiation emitted from atomic vibrations in the combustion byproduct gases as well as the energy emitted by lattice vibrations at wavelengths longer than 4 microns. For TPV systems using low bandgap cells (such as GaSb cells) and a metal-dielectric long wavelength reflecting filter, there is a need for an emitter with high emittance in the cell response band (1 to 1.8 microns for GaSb) and low emittance in the wavelength interval just beyond the cell response band (2 to 4 microns for GaSb).

Needs also exist for TPV generators having emitters that are compatible for use with any source of heat.

SUMMARY OF THE INVENTION

The present invention is a thermophotovoltaic electric generating apparatus that provides for efficient power generation by incorporating a heat source, an infrared emitter, and an array of low bandgap photovoltaic cells. The infrared emitter has a wide, single high emissivity power band that is nearly ideally matched with the response band of low bandgap GaSb photovoltaic cells and other cells with similar bandgap energies. Generally, pure ceramic oxides lightly doped with 3d transition metals strongly emit infrared radiation in a broad power band which can match the spectral response band of low bandgap photovoltaic cells. Specifically, cobalt doped alumina or magnesia ceramic materials can be used to form such a matched emitter since those materials emit infrared radiation strongly in the 1 to 1.8 micron band with highly suppressed infrared emission in the 2 to 4 micron band. Furthermore, any cobalt doped ceramic oxide where the cobalt doping site has octahedral symmetry with an oxygen coordination number of six can form such a 1 to 1.8 micron power band matched emitter.

The present generating apparatus can be used with any heat source including but not limited to hydrocarbon combustion, radioisotope, or nuclear reactor heat sources. One preferred embodiment uses a radioisotope as the heat source. Generators having radioisotope heat sources, cobalt oxide doped alumina or magnesia refractory emitters and GaSb TPV cell receivers have uses in space applications, such as interplanetary missions including a future Pluto flyby. In other preferred embodiments, the generators include nuclear reactors as the heat sources. In one example, electric generators having InGaAs or GaInSbAs thermophotovoltaic cell receivers are installed onboard ships having nuclear reactors. Cobalt doped refractory oxide emitters are heated by the nuclear reactors and emit infrared radiation which is collected and converted to electric power by receivers, thereby creating a continuous, inexpensive, clean and efficient onboard power supply.

The present invention relates to power band matched infrared emitters that are exceptionally well suited for use with recently developed GaSb photovoltaic cells. The construction of highly efficient thermophotovoltaic (TPV) apparatus for generating electrical power is now possible with the combination of the present power band matched infrared emitters and low bandgap photovoltaic cells which are responsive to wavelengths in the 1 to 2 micron range.

In a preferred embodiment of the present invention, a long wavelength reflecting metal-dielectric filter is placed on each photovoltaic cell to reflect back the infrared radiation from the matched emitter at wavelengths longer than 4 microns. In the case that the matched infrared emitter is heated by hydrocarbon combustion, that same long wavelength reflecting metal-dielectric filter will also reflect the radiation from the atomic vibration modes from the byproduct combustion gases. That preferred embodiment TPV apparatus includes a heat source for heating an infrared emitter. The emitter emits infrared radiation strongly in a broad power band region (e.g. 1 to 1.8 microns for cobalt doped alumina or magnesia) which is matched with the energy conversion band of a low bandgap TPV cell 1 to 1.8 microns for the GaSb cell). The emitter emits weakly at wavelengths longer than the cell band edge 2 to 4 microns for cobalt doped magnesia or alumina). A long wavelength reflecting metal-dielectric filter is placed over the low bandgap cell and transmits the power band wavelengths 1 to 1.8 microns) to the cell while reflecting the radiation with wavelengths longer than 4 microns back to the emitter.

These and further and other objects and features of the invention are apparent in the disclosure, which includes the above and ongoing written specification, with the claims and the drawings.

BRIEF DESCRIPTION OF THE DRAWINGS

FIG. 2 is a graphic comparison of the solid "selective" emitters of Guazzoni, the improved fibrous "selective" emitters of Nelson, and the superior high emissivity, wide power band emitter that is provided in the present invention.

FIG. 3 graphically shows the emittance as a function of wavelength for a cobalt doped magnesia matched emitter.

FIG. 5 graphically shows the emissive power of alumina with and without cobalt oxide doping as compared with the spectra of a blackbody emitter.

DETAILED DESCRIPTION OF THE PREFERRED EMBODIMENTS

Figure 1:
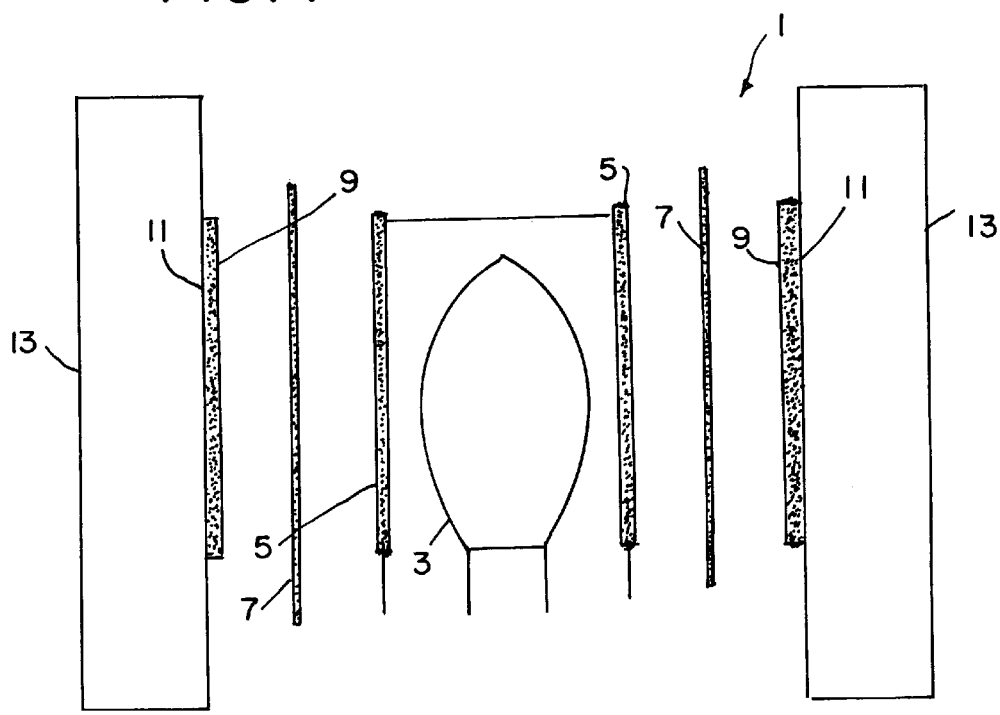
FIG. 1 shows a vertical section through a preferred thermophotovoltaic generator having, in the order of energy flow, a heat source, a matched infrared emitter, an optional silica heat shield, an infrared filter, and a low bandgap photovoltaic cell.

Referring to FIG. 1, the present thermophotovoltaic generator apparatus 1 includes, in the order of energy flow, a heat source 3, a matched infrared emitter 5, an optional silica heat shield 7, an infrared filter 9 and a low bandgap photovoltaic cell receiver 11. The power band of the emitter 5 is matched with the energy conversion band of the TPV cells of the receiver 11. The heat source 3 heats the infrared emitter 5, which in turn emits infrared radiation. Low bandgap cells of the receiver 11 collect infrared radiation of a particular wavelength and convert the collected infrared radiation to electric power. The infrared filter 9, which is preferably a long wavelength reflecting metal-dielectric filter, is preferably positioned on each cell of the receiver 11 for reflecting back to the emitter 5 infrared radiation that exceed a predetermined wavelength. In embodiments where the emitter 5 is heated by hydrocarbon combustion, the filter 9 also reflects radiation from the atomic vibration modes from the byproduct combustion gases. Heat shields 7 may also be positioned between the emitter 5 and the receiver 11 for redirecting combustion byproduct gases.

The emitter 5 may take any size and shape. In one preferred embodiment, the emitter 5 includes between about 100 ppm and about 5,000 ppm of $Co_3O_4$ in a pure alumina lattice. In another preferred embodiment, the emitter 5 includes between about 200 ppm and about 10,000 ppm $Co_3O_4$ in a pure magnesia lattice. The receiver 11 is preferably a circuit having an inner surface which faces the emitter and a back surface. Multiple thermophotovoltaic cells are connected to or form the inner surface of the circuit. Preferably, heat sinks 13, such as cooling fins, or other means for removing heat from the receiver are connected to the back surface of the circuit. The thermophotovoltaic cells are preferably selected from the group including Ge cells, GaSb cells, In(1−z)Ga(z)As cells, and Ga(1−x)In(x)Sb(1−y)As(y), where x and y range between 0 and 0.2 and z ranges between 0.3 and 0.7. Generally, GaSb cells respond out to about 1.8 microns and GaInSbAs cells respond out to about 2.1 microns.

Any heat source 3 may be used in connection with the matched emitter/TPV cell receiver assembly. That contributes to the universal compatibility of the present generator and allows for its mobile use in remote locations where sources of electric power are sparse, absent, or unavailable. The generator 1 is provided with a heat source 3 or is constructed for mounting on a heat source 3 or for holding a heat source 3, such as a radioisotope. The heat source 3 may be a radioactive heat source. In one preferred embodiment of the present invention, the radioactive heat source is a nuclear reactor. Immense heat is generated in nuclear reactors by the fission of uranium fuel. Generally, the generated heat is transferred from the reactor to a steam generator, where the heat is exploited to provide power. In the present invention, heat from the nuclear reactor acts directly on the matched infrared emitter. As the emitter increases in temperature, infrared radiation is released. The released radiation is captured by a TPV cell receiver having a spectral response band matched to the emission band of the emitter. In preferred embodiments, generators using nuclear reactors as heat sources include InGaAs or GaInSbAs thermophotovoltaic cell receivers.

A key feature of the present invention is the matching of the emitter IR power band to the photovoltaic cell response band. The following paragraphs describe the chemical and spectral characteristics of the infrared matched emitter and the roles played by the silica shield and the infrared filter.

The present invention relates to emitters with a wide, single high emissivity power band that is nearly ideally suited for use with low bandgap GaSb photovoltaic cells and other cells with similar bandgap energies.

Several groups of high temperature ceramics have an energy band structure similar to the semiconductor materials where there is a forbidden energy bandgap. In certain ceramics (pure SiC and refractory oxides for example) this energy gap is 3 to 5 electron volts wide and requires ultraviolet photons to excite electrons from the valence band into the conduction band.

Nearly a century ago, Carl Auer (the inventor of the "Welsbach Mantle") discovered that the addition of small amounts of ceria to thorium oxide moves the high absorption band edge of the pure oxide from the ultraviolet region down into the visible portion of the spectrum to create a useful lantern. It was also shown that the thickness of the material may be decreased to further reduce the radiation at wavelengths longer than the absorption edge attributed mostly to lattice vibrations, free charge carriers that originate from impurities, lattice defects or thermally broken bonds.

The present invention includes apparatus and methods for creating a steep absorption band edge in particular groups of ceramics that extends well into the infrared portion of the electromagnetic spectrum where the radiation can be used very efficiently by low bandgap photovoltaic cells matched to that portion of the spectrum. In other words, an emitter is created with an energy bandgap at its operating temperature that matches the bandgap of the photovoltaic cells. That matched bandgap combination of emitter and infrared photovoltaic cell is very efficient when compared to emitters with blackbody or greybody radiation, which are far too broad, and "selective" emitters, which are much too narrow. FIG. 2 is a comparison of the solid "selective" emitters of Guazzoni, the improved fibrous "selective" emitters of Nelson, and the superior high emissivity, wide power band emitter that is included in the present invention. Curve 15 graphically shows the Guazzoni emitter; curve 17 graphically shows the Nelson emitter; and curve 19 graphically shows the bandgap matched emitter of the present invention.

The refractory ceramics for use in the present invention preferably have a very high melting point of at least 1700 C. In the pure state, it is desirable for those materials to have as low an emissivity as possible beyond about 1 micron in the infrared wavelength range when heated to operating temperatures of about 1200 C. to 1600 C.

Suitable examples are refractory materials in the rock salt structural group including MgO, materials in the corundum group including alumina, materials in the fluorite structural group including thoria, stabilized zirconia, and yttria, and various other refractories including spine ($MgAl_2O_4$), fused silica, pure silicon carbide, borides, and nitrides.

Most of those suitable low emissivity refractories may be viewed as coordination compounds composed of cations and anions that have some fraction of tetrahedral and octahedral sites filled, depending on the particular structure. "Crystal Theory" has been successfully used to describe the energy relationships of ions in crystals and will be employed here to gain insight as to which compositions work best in the present invention.

It is known that when an ion is surrounded by coordinating agents the electronic orbital energies of that ion may be raised to higher levels if the crystal field of the coordinating agent is symmetrical with respect to the orbitals of the ion. For example, the magnesium ion in MgO is in an octahedrally symmetric coordinating crystal field and the magnesium ion has octahedrally symmetric p type orbitals in its outer electron shell which raises the energy of those orbitals and creates a large energy gap. The introduction of an ion with antisymetrical orbitals with respect to the coordinating field causes splitting and the creation of new molecular orbitals which may reduce the energy gap between orbitals. When small amounts of cobalt ions are substituted for the magnesium ions in MgO an energy absorption band edge appears at about 1.7 microns. A desirable forbidden energy gap between nearly continuous bands of energy is created by the interaction of the outer d orbitals of the cobalt ion and the octahedral crystal coordinating field. Thermal fluctuations at high emitter temperatures aid in creating the nearly continuous energy bands from closely spaced energy levels above a forbidden gap. FIG. 3 shows the emittance as a function of wavelength for a cobalt doped magnesia matched emitter.

Figure 4:
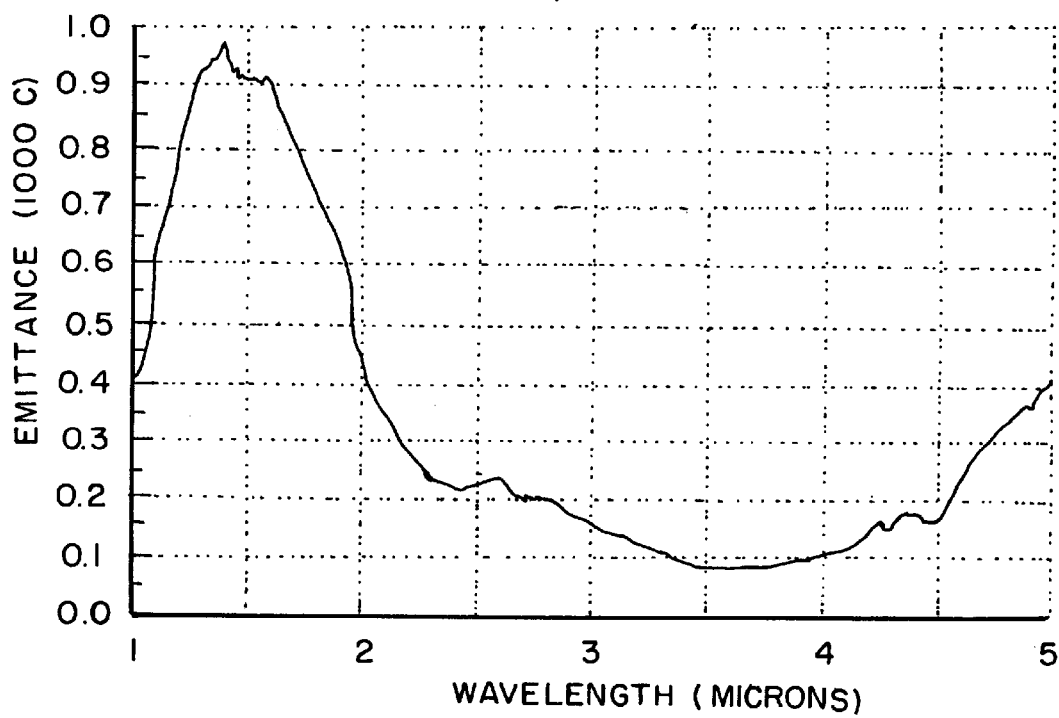
FIG. 4 graphically shows the emittance as a function of wavelength for a cobalt doped alumina matched emitter.

When a small amount of cobalt ions are substituted for the aluminum ion in $Al_2O_3$, an useful absorption energy band appears at about 1.8 microns. FIG. 4 shows the emittance as a function of wavelength for a cobalt doped alumina matched emitter.

FIG. 5 graphically represents the emissive power of "Blue Alumina", i.e., alumina with cobalt doping. FIG. 2 shows the infrared power spectra for "Blue Alumina" and "White Alumina" (alumina without cobalt doping) viewed through a glass window as compared with the power spectra of a blackbody emitter. Curve 21 graphically represents the power spectra for alumina with cobalt doping. Curve 23 graphically represents the power spectra for alumina without cobalt doping. Curve 25 graphically represents the emissive power of a blackbody emitter.

Unlike MgO which has all of its octahedral sites filled, alumina has ⅓ of its octahedral sites empty and the cobalt ions appear somewhat less stable in the alumina than the MgO. That is probably due to the empty sites in alumina.

Figure 6:
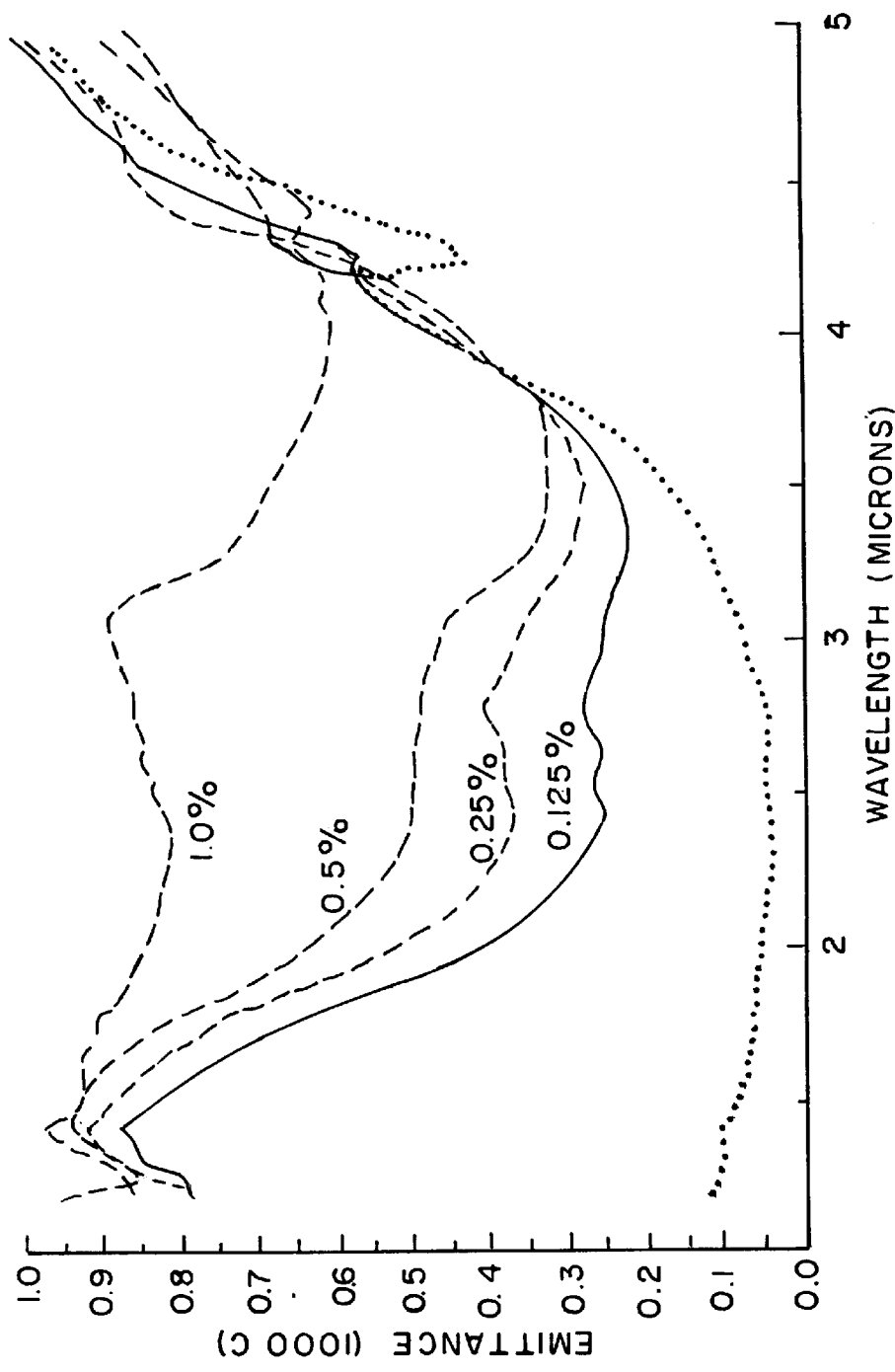
FIG. 6 graphically shows the emittance as a function of wavelength and dopant concentration for a cobalt doped alumina matched emitter.

When the concentration of cobalt ions is increased above the small optimum doping concentration the emissive power spectrum of the material at high temperatures approaches a blackbody, indicating the elimination of a forbidden gap as the energy bands crowd together. When the concentration of cobalt is reduced below the optimum level the very high spectral emittance rapidly decreases in the desirable wavelength region as the edge of the absorption band shifts to shorter wavelengths. FIG. 6 shows the emittance as a function of wavelength and dopant concentration for a cobalt doped alumina matched emitter.

In preferred embodiments of the emitter for use in the present invention, the outer electronic orbital configuration of the substitute ion is interactive with respect to the crystal field. It is not required that any inner electron orbitals be partially filled as is generally the case with "selective" emitters which behave essentially like isolated atoms with discrete quantum transitions between f and d levels due to shielding of the crystal field by outer electrons. The pure refractory material should have as low an emittance as possible at wavelengths longer than 1 micron. An energy band gap of 3 to 5 ev is desirable. An optimum doping concentration can be achieved where emissive power above the absorption band edge approaches a blackbody and where emissive power at wavelengths longer than the absorption band edge is not significantly higher than the emission of the base refractory. Coordinating compounds with large fractions of the octahedral or tetrahedral sites filled are preferable because the substitute ions are more stable and resist migration. Substitutional ions will generally satisfy coordination rules for the ratio of ionic radii in coordination compounds, $0.225 < r/R < 0.414$ for C.N.=4 and $0.414 < r/R < 0.732$ for C.N.= 6.

Turning now to the specific spectral characteristics of the matched emitters shown in FIGS. 3 and 4, one can identify three spectral regions. The emittance is high in the 1 to 1.8 micron range as a result of a broad dopant electronic energy band. This electronic emission band is well matched to the response bands of GaSb and related low bandgap cells. The emittance is then quite low in the 2 to 4 micron range. The emittance rises again in the 4 micron and longer range as a result of the ceramic oxide vibration modes. Referring back to FIG. 1, it is clear that the three components, the matched emitter 5, the infrared filter 9, and the low bandgap cell receiver 11 form a complimentary spectral control set for an efficient TPV converter assembly 1. The emitter 5 emits strongly and the filter 9 transmits efficiently in the band where the cells of the receiver 11 respond. The emitted power then falls rapidly for the intermediate wavelengths where the cells do not respond but the filter 9 still transmits. Finally, the filter 9 reflects efficiency at the longer wavelengths where the cells do not respond but the emitter 5 unfortunately emits again as a result of lattice vibrations.

The optional silica heat shield 7 in FIG. 1 is included for completeness because in some combustion geometries, the combustion byproduct gases flow through the emitter and are confined by the heat shield 7. With other heat sources or with some combustion geometries, the shield 7 is not needed.

While the invention has been described with reference to specific embodiments, modifications and variations of the invention may be constructed without departing from the scope of the invention, which is defined in the following claims.

We claim:

1. A thermophotovoltaic generator system comprising an infrared emitter and a low bandgap photovoltaic converter assembly, wherein the emitter further comprises a host refractory coordination compound with low emissivity in the 1 to 5 micron range in its pure state, wherein the host refractory compound is doped with a sufficient number of substitutional ions to create a material for emitting near blackbody radiation in a wide wavelength band above a threshold energy level and for emitting an amount of radiation at wavelengths longer than the threshold level, and wherein the infrared responding photovoltaic converter is matched to the emitter for absorbing power above the same threshold energy level.

2. The system of claim 1, further comprising coordinating ions, wherein electron orbitals of the substitutional ions overlap with electric fields of the coordinating ions to create multiple closely spaced energy levels above a ground state energy level, and an energy gap that matched to the photovoltaic converter having an energy band gap similar to GaSb.

3. The system of claim 1, wherein the emitter comprises between about 100 ppm and about 5,000 ppm of $Co_3O_4$ in a pure alumina lattice.

4. The system of claim 1, wherein the emitter comprises between about 200 ppm and about 10,000 ppm $Co_3O_4$ in a pure magnesia lattice.

5. A thermophotovoltaic generator apparatus comprising a heat source and a thermophotovoltaic unit, wherein the thermophotovoltaic unit further comprises an infrared cobalt oxide doped refractory ceramic emitter positioned with respect to the heat source for receiving heat from the heat source and for emitting infrared radiation when heated by the heat source and a photovoltaic cell receiver positioned with respect to the emitter for receiving the infrared radiation from the emitter and for converting the infrared radiation to electric power, wherein the emitter has an emissivity band, wherein photovoltaic cells of the receiver have a response band, and wherein the emissivity band of the emitter is matched with the response band of the photovoltaic cells of the receiver.

6. The apparatus of claim 5, wherein the ceramic emitter is of a ceramic material selected from the group consisting of alumina and magnesia.

7. The apparatus of claim 6, wherein the alumina or magnesia is doped with cobalt oxide.

8. The apparatus of claim 7, wherein the emitter comprises between about 100 ppm and about 5,000 ppm of $Co_3O_4$ in a pure alumina lattice.

9. The apparatus of claim 7, wherein the emitter comprises between about 200 ppm and about 10,000 ppm $Co_3O_4$ in a pure magnesia lattice.

10. The apparatus of claim 5, wherein the emitter further comprises cobalt ions substituted for ions of the ceramic material at octahedrally symmetric sites within the ceramic material.

11. The apparatus of claim 5, wherein the photovoltaic cells are low bandgap photovoltaic cells selected from the group consisting of Ge cells, GaSb cells, $In(1-z)Ga(z)As$ cells and $Ga(1-x)In(x)Sb(1-y)As(y)$, where x and y range between 0 and 0.2 and z ranges between 0.3 and 0.7.

12. The apparatus of claim 5, wherein the heat source is a radioactive heat source.

13. The apparatus of claim 12, wherein the radioactive heat source is selected from the group consisting of a nuclear reactor and a radioisotope.

14. The apparatus of claim 5, further comprising an infrared filter positioned between the emitter and the photovoltaic cells of the receiver.

15. The apparatus of claim 14, wherein the filter is a metal-dielectric filter positioned on inner surfaces of the photovoltaic cells of the receiver.

16. The apparatus of claim 15, wherein the heat source is a hydrocarbon combustion heat source, and further comprising a heat shield positioned between the emitter and the photovoltaic cells of the receiver.

17. The apparatus of claim 5, wherein the receiver further comprises a circuit having an inner surface toward the emitter and an outer surface and thermophotovoltaic cells positioned in the inner surface of the circuit.

18. The apparatus of claim 17, further comprising heat sinks thermally connected to the outer surfaces of the circuit.

19. The apparatus of claim 18, wherein the heat sinks further comprise aluminum fin extensions.

20. The apparatus of claim 17, wherein the circuit is a flexible circuit.

21. A thermophotovoltaic generator apparatus comprising a thermophotovoltaic unit for positioning with respect to a heat source, wherein the thermophotovoltaic unit further comprises an infrared energy-band-matched refractory ceramic emitter for emitting infrared radiation when heated by the heat source, a receiver positioned near the emitter for receiving the infrared radiation and for converting the infrared radiation to electric power, and a filter positioned between the receiver and emitter for reflecting infrared radiation of undesired wavelengths back to the emitter, and wherein the emitter has an electronic energy infrared emission band matched to the response energy band of the receiver.

22. The apparatus of claim 21, wherein the receiver further comprises an array of low bandgap thermophotovoltaic cells, and wherein the low bandgap cells respond to the infrared radiation in the wavelength interval between about 1 and 2.1 microns.

23. The apparatus of claim 21, wherein the emitter comprises a ceramic material having an oxygen coordination number of six and wherein cobalt oxide ions are positioned on the ceramic material in sites of octahedral symmetry.

24. The apparatus of claim 23, wherein all octahedral sites on the cobalt oxide doped refractory ceramic are occupied.

25. The apparatus of claim 21, wherein the heat source is a combustion heat source.

26. The apparatus of claim 21, wherein the heat source is a radioactive heat source positioned for heating the emitter.

27. The apparatus of claim 26, wherein the radioactive heat source is selected from the group consisting of an isotope and a nuclear reactor.

28. The apparatus of claim 21, wherein the emitter comprises a refractory ceramic material selected from the group consisting of cobalt oxide doped alumina and cobalt oxide doped magnesia.

29. The apparatus of claim 21, further comprising a heat shield positioned between the receiver and the emitter.

30. A thermophotovoltaic generator apparatus comprising a heat source, an infrared emitter positioned with respect to the heat source, an array of low bandgap photovoltaic cells positioned with respect to the emitter, and a metal dielectric filter positioned on the photovoltaic cells of the array, wherein the infrared emitter has a wide, single high emissivity power band, wherein the photovoltaic cells of the receiver have an energy conversion band, and wherein the emissivity power band is matched with the energy conversion band.

31. The apparatus of claim 30, wherein the heat source is a combustion heat source, and further comprising a heat shield positioned between the emitter and the receiver.

32. The apparatus of claim 30, wherein the emitter emits strongly in the about 1 to 1.8 region and weakly at wavelengths longer than energy conversion band of the photovoltaic cells.

33. The apparatus of claim 30, wherein the filter is placed over the low bandgap photovoltaic cells, and wherein the filter transmits the power band wavelengths of the cells and reflects the radiation with undesirable wavelengths back to the emitter.

* * * * *